United States Patent
Kim et al.

(10) Patent No.: US 9,539,961 B2
(45) Date of Patent: Jan. 10, 2017

(54) SYSTEM AND METHOD FOR VEHICLE AUTONOMOUS EMERGENCY BRAKING

(71) Applicant: HYUNDAI MOBIS Co., Ltd., Yongin-si, Gyeonggi-do (KR)

(72) Inventors: Jae Yoon Kim, Yongin-si (KR); Seung Wuk Moon, Yongin-si (KR); Il Ki Moon, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/835,873

(22) Filed: Aug. 26, 2015

(65) Prior Publication Data
US 2016/0082935 A1 Mar. 24, 2016

(30) Foreign Application Priority Data
Sep. 18, 2014 (KR) .................. 10-2014-0124516

(51) Int. Cl.
| | |
|---|---|
| B60T 7/22 | (2006.01) |
| B60R 16/023 | (2006.01) |
| B60T 7/12 | (2006.01) |
| B60T 7/20 | (2006.01) |
| B60T 8/171 | (2006.01) |
| B60T 8/1755 | (2006.01) |

(52) U.S. Cl.
CPC ............ *B60R 16/0233* (2013.01); *B60T 7/12* (2013.01); *B60T 7/20* (2013.01); *B60T 8/171* (2013.01); *B60T 8/17558* (2013.01)

(58) Field of Classification Search
CPC .............................. B60T 7/22; B60R 16/0233
USPC .............................................................. 701/70
See application file for complete search history.

(56) References Cited

U.S. PATENT DOCUMENTS

| | | | |
|---|---|---|---|
| 2008/0201033 A1* | 8/2008 | DeMersseman | G01B 21/24 701/30.5 |
| 2013/0226431 A1* | 8/2013 | Lu | B60W 50/0098 701/96 |
| 2013/0338877 A1* | 12/2013 | Straus | G08G 1/161 701/41 |
| 2015/0253774 A1* | 9/2015 | Takaoka | G05D 1/0088 701/23 |

FOREIGN PATENT DOCUMENTS

JP 2008-292271 * 4/2008

OTHER PUBLICATIONS

Machine Translation of JP 2008-292271 published Apr. 2008.*

* cited by examiner

*Primary Examiner* — Anne M Antonucci
(74) *Attorney, Agent, or Firm* — Paratus Law Group, PLLC (57) ABSTRACT

The present invention provides an autonomous emergency braking system of a vehicle including a sensor module which radiates a signal when the vehicle is being driven to the front of the vehicle to detect an object in front of the vehicle, an autonomous control module which determines whether the object collides with the vehicle and when it is determined that the object collides with the vehicle, puts the brake on the vehicle, and a sensor control module that when the vehicle puts on the brakes and is forwardly inclined, adjusts a signal radiating direction of the sensor module to control the sensor module to detect the object.

8 Claims, 6 Drawing Sheets

SYSTEM AND METHOD FOR VEHICLE AUTONOMOUS EMERGENCY BRAKING

CROSS-REFERENCE TO RELATED APPLICATIONS

The present application claims priority to Korean Patent Application Number 10-2014-0124516 filed Sep. 18, 2014, the entire contents of which application is incorporated herein for all purposes by this reference.

ACKNOWLEDGEMENTS

This research was supported by the Korea Ministry of Land, Infrastructure, and Transport. It was also supported by the Korea Agency for Infrastructure Technology Advancement (Project No.: 15PTSI-CO54118-07).

TECHNICAL FIELD

The present invention relates to an autonomous emergency braking system of a vehicle and an autonomous emergency braking method, and more particularly, to an autonomous emergency braking system of a vehicle and an autonomous emergency braking method which prevent a forward vehicle from being undetected due to a pitching motion of the vehicle at the time of autonomous emergency braking of a vehicle.

BACKGROUND

An autonomous emergency braking (AEB) system is a system which performs a warning and autonomous braking function to minimize a possibility of collision when a driven vehicle is expected to collide with a vehicle ahead the driven vehicle.

Generally, the AEB system is configured to monitor a relative distance from the forward vehicle and monitor whether there is a forward vehicle to determine when the AEB operates. A radar sensor, a light detection and ranging (LIDAR) sensor, and a camera sensor are used as a forward vehicle monitoring sensor which is currently used.

Here, a detection performance may be lowered due to vehicle motion in an AEB using the radar sensor. When the vehicle brakes, a pitching motion occurs in the vehicle and a front part of the vehicle is inclined toward the ground so that a direction of the front sensor is inclined toward the ground. When the front radar misses a risky vehicle due to the inclination, the AEB system may determine that the risky collision situation of the front side ends so that autonomous braking ends so that the vehicle may collide with the forward vehicle.

Recently, a technology which overcomes a situation where the sensor module does not detect the forward vehicle in accordance with the pitching motion of the vehicle which is generated in an autonomous emergency braking situation is being studied.

SUMMARY

The present invention has been made in an effort to provide an autonomous emergency braking system of a vehicle and an autonomous emergency braking method which prevent a forward vehicle from being undetected due to a pitching motion of the vehicle at the time of braking of the vehicle.

An exemplary embodiment of the present invention provides an autonomous emergency braking system of a vehicle including a sensor module which radiates a signal to the front of the vehicle when the vehicle is being driven to detect an object in front of the vehicle, an autonomous control module which determines whether the object collides with the vehicle and when it is determined that the object collides with the vehicle, puts the brake on the vehicle, and a sensor control module that when the vehicle puts on the brakes and is forwardly inclined, adjusts a signal radiating direction of the sensor module to control the sensor module to detect the object.

Another exemplary embodiment of the present invention provides an autonomous emergency braking method of a vehicle including an object detecting step of radiating a signal to the front of the vehicle when the vehicle is being driven to detect an object in front of the vehicle, a vehicle braking step of determining whether the object collides with the vehicle and putting the brake on the vehicle when it is determined that the object collides with the vehicle, and a sensor control step of, when the vehicle brakes to be forwardly inclined, adjusting a signal radiating direction to detect the object.

According to the present invention, when a pitching motion of a vehicle is generated during the braking of a vehicle, a signal radiating direction of the sensor module is adjusted, thereby improving the detecting performance of the forward vehicle.

DETAILED DESCRIPTION

Advantages and characteristics of the present invention, and a method of achieving the advantages and characteristics will be clear by referring to exemplary embodiments described below in detail together with the accompanying drawings. However, the present invention is not limited to exemplary embodiment disclosed herein but will be implemented in various forms. The exemplary embodiments are provided to enable the present invention to be completely disclosed and the scope of the present invention to be easily understood by those skilled in the art. Therefore, the present invention will be defined only by the scope of the appended claims. Like reference numerals indicate like elements throughout the specification.

Unless otherwise defined, all terms (including technical and scientific terms) used in the present specification may be used as the meaning which may be commonly understood by the person with ordinary skill in the art, to which the present invention belongs. It will be further understood that terms defined in commonly used dictionaries should not be interpreted in an idealized or excessive sense unless expressly and specifically defined.

Figure 1:
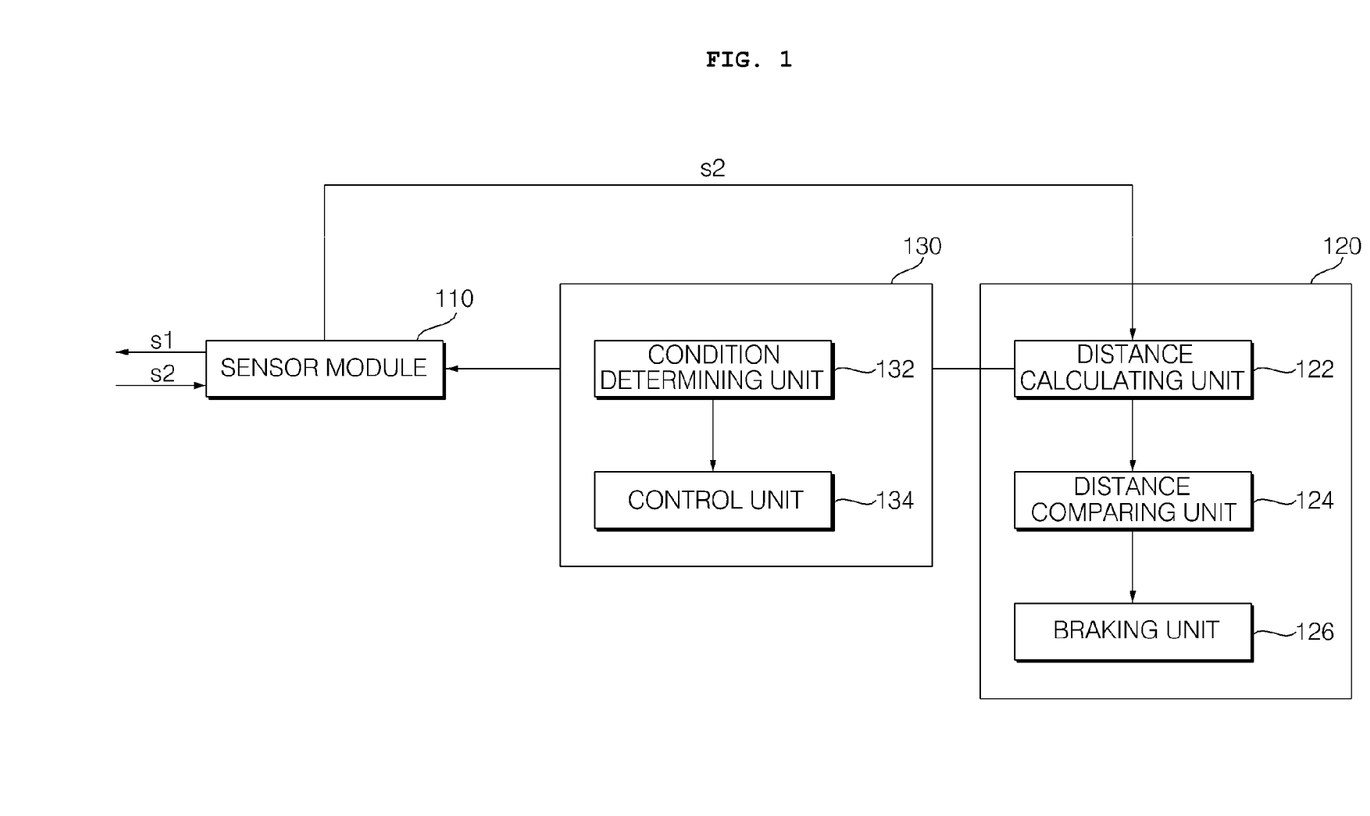
FIG. 1 is a block diagram illustrating a configuration of an autonomous emergency braking system of a vehicle according to an exemplary embodiment of the present invention.

A configuration of an autonomous emergency braking system of a vehicle according to an exemplary embodiment of the present invention will be specifically described with reference to FIG. 1. FIG. 1 is a control block diagram illustrating a control configuration of an autonomous emergency braking system of a vehicle according to an exemplary embodiment of the present invention. Referring to FIG. 1, an autonomous emergency braking system of a vehicle according to an exemplary embodiment of the present invention may include a sensor module 110, an autonomous control module 120, and a sensor control module 130.

Specifically, the autonomous emergency braking system of a vehicle according to an exemplary embodiment of the present invention may include the sensor module 110 which radiates a signal to the front of the vehicle when the vehicle is being driven to detect an object in front of the vehicle, the autonomous control module 120 which determines whether the object collides with the vehicle and when it is determined that the object collides with the vehicle, puts the brakes on the vehicle, and the sensor control module 130 that when the vehicle brakes and is forwardly inclined, adjusts a signal radiating direction of the sensor module 110 to control the sensor module 110 to detect the object.

The sensor module 110 is provided in the vehicle and a plurality of sensor modules may be provided and detects an object located in front of the vehicle while driving the vehicle. For example, the sensor module may detect another vehicle which is being driven or stops in front of the vehicle.

The sensor module 110 radiates a signal s1 to the front of the other vehicle. The radiated signal s1 straightly proceeds and is reflected when the signal s1 meets an object. The sensor module 110 receives a signal s2 which is reflected and returns. When the sensor module 110 receives the signal s2 which is reflected and returns, the sensor module 110 transmits a time when the radiated signal s1 is reflected and returns to the autonomous control module 120.

The sensor module 110 has a detecting area which is a specific area where an object is detected. The sensor module 110 may detect the object only when the object is located in the detecting area.

The sensor module 110 may include at least one of a light detection and ranging (LIDAR) sensor, an ultrasonic wave sensor, and a laser sensor. For example, when a camera sensor is applied as the sensor module 110, an image corresponding to the detecting area is photographed and then transmitted to the autonomous control module 120. When the sensor module 110 detects an object, the sensor module is not limited thereto.

The autonomous control module 120 may include a distance calculating unit 122, a distance comparing unit 124, and a braking unit 126.

Specifically, the autonomous control module 120 may include the distance calculating unit 122 which calculates a distance between the vehicle and the object, the distance comparing unit 124 which calculates an estimated collision distance and compares the estimated collision distance with the distance, and the braking unit 126 which when the distance is shorter than the estimated collision distance, puts the brakes on the vehicle.

The distance calculating unit 122 measures an acceleration and a speed of the vehicle and calculates the distance using the time when the signal s1 radiated from the sensor module 110 is reflected and returns.

Specifically, when the sensor module 110 receives the signal s2 which is reflected from an object located in front of the vehicle and returns, the distance calculating unit 122 may calculate the distance from the object based on a time difference between the signal s1 radiated from the sensor module 110 and the signal s2 which is reflected and returns and a vehicle speed.

The distance calculating unit 122 may calculate the distance from the object using a signal strength of the signal s2 which is reflected and returns and the time difference between the signal s1 radiated from the sensor module 110 and the signal s2 which is reflected and returns, but is not limited thereto.

The distance comparing unit 124 may compare the distance calculated by the distance calculating unit 122 with a set estimated collision distance.

The estimated collision distance is a minimum distance which avoids the collision between the vehicle and an object located in front of the vehicle and may vary depending on the vehicle speed, but is not limited thereto.

The braking unit 126 may put the brakes on the vehicle when the distance is shorter than the estimated collision distance as a result of the comparison of the distance comparing unit 124 and output state information including an acceleration and a speed of the vehicle while putting the brakes on the vehicle and issue a warning to a driver.

Specifically, when the distance is shorter than the estimated collision distance in accordance with the vehicle speed, the braking unit 126 may autonomously put the brakes on the vehicle because the vehicle is highly likely to collide with the object located in front of the vehicle.

The sensor control module 130 may include a condition determining unit 132 and a control unit 134.

Specifically, the sensor control module 130 may include the condition determining unit 132 which compares the acceleration with a predetermined threshold acceleration to determine whether the vehicle is forwardly inclined and determine whether to adjust the signal radiating direction of the sensor module 110 and the control unit 134 which when it is determined to adjust the signal radiating direction of the sensor module 110, controls the signal radiating direction of the sensor module 110 so as to allow the sensor module 110 to detect the object.

When the vehicle suddenly brakes while being driven, the vehicle is forwardly inclined due to inertia law. This case is represented that the pitching motion of the vehicle is generated.

The condition determining unit 132 compares the acceleration of the vehicle output from the distance calculating unit 122 with the set threshold acceleration to determine whether the vehicle is forwardly inclined.

When the vehicle is forwardly inclined, a direction of radiating the signal by the sensor module 110 is also downwardly inclined and thus the object which is located in front of the vehicle is not located in a detecting area s. Therefore, the radiated signal s1 does not reach the object which is located in front of the vehicle and the sensor module 110 does not detect the object located in front of the vehicle.

In order to detect the object in front of the vehicle even when the vehicle is forwardly inclined, a direction of radiating the signal by the sensor module 110 is upwardly adjusted as much as the vehicle is inclined.

Therefore, when it is determined that the vehicle is forwardly inclined, the condition determining unit 132 determines that the signal radiating direction of the sensor module 110 needs to be upwardly adjusted.

In other words, the condition determining unit 132 determines whether the pitching motion of the vehicle is generated and determines whether to adjust the signal radiating direction of the sensor module 110.

Specifically, when the acceleration is larger than the threshold acceleration, the condition determining unit 132 determines that the vehicle is forwardly inclined and determines to adjust the signal radiating direction of the sensor module 110 and when the acceleration is smaller than the threshold acceleration, determines that the vehicle is not forwardly inclined and determines not to adjust the signal radiating direction of the sensor module 110.

The control unit 134 may directly adjust the signal radiating direction of the sensor module 110. When the condition determining unit 132 detects the inclination of the vehicle to determine that the signal radiating direction of the sensor module 110 needs to be adjusted, the control unit 134 upwardly controls the signal radiating direction of the sensor module 110 so that the sensor module 110 detects the object.

The vehicle may include a tilting sensor. The tilting sensor may detect and output a current inclination of the vehicle. The control unit 134 may adjust the signal radiating direction of the sensor module 110 in accordance with the inclination detected by the tilting sensor.

The condition determining unit 132 compares the acceleration with the set threshold acceleration after adjusting the signal radiating direction of the sensor module 110 and determines whether the vehicle is inclined and then is in an uninclined state to determine whether to adjust the signal radiating direction of the sensor module 110 to an original direction.

When the condition determining unit 132 determines to adjust the signal radiating direction of the sensor module 132 to an original direction, the control unit 134 may adjust the signal radiating direction of the sensor module 110 to the original direction.

When the vehicle completely stops, the inclination of the vehicle returns to the original state. As described above, when the inclination of the vehicle changes and then the inclination of the vehicle returns to the original state, the autonomous emergency braking system of the vehicle according to the exemplary embodiment of the present invention may adjust the signal radiating direction of the sensor module 110 to the original direction.

FIGS. 2 to 5 illustrate an example in which an autonomous emergency braking system of a vehicle according to an exemplary embodiment of the present invention operates. An operating process of the autonomous emergency braking system described above will be described with reference to FIGS. 2 to 5.

Figure 2:
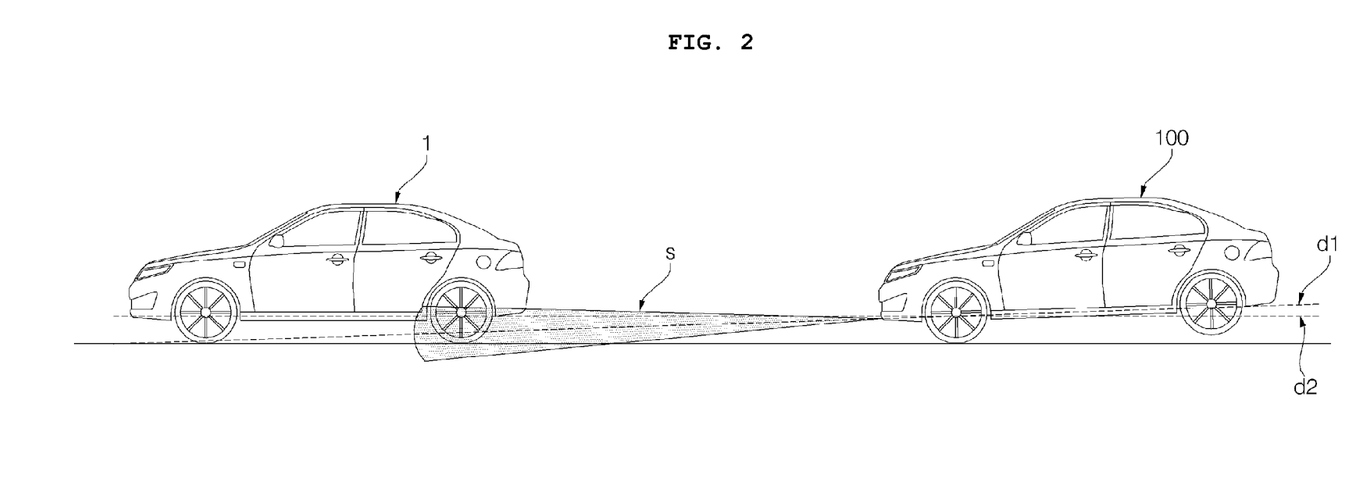
FIGS. 2 to 5 are exemplary views illustrating an example in which an autonomous emergency braking system of a vehicle according to an exemplary embodiment of the present invention is applied.

As illustrated in FIG. 2, the sensor module 110 of the vehicle 100 radiates a signal and receives a signal which is reflected by the front vehicle 1 in the detecting area s to detect a stopped vehicle 1.

Figure 3:
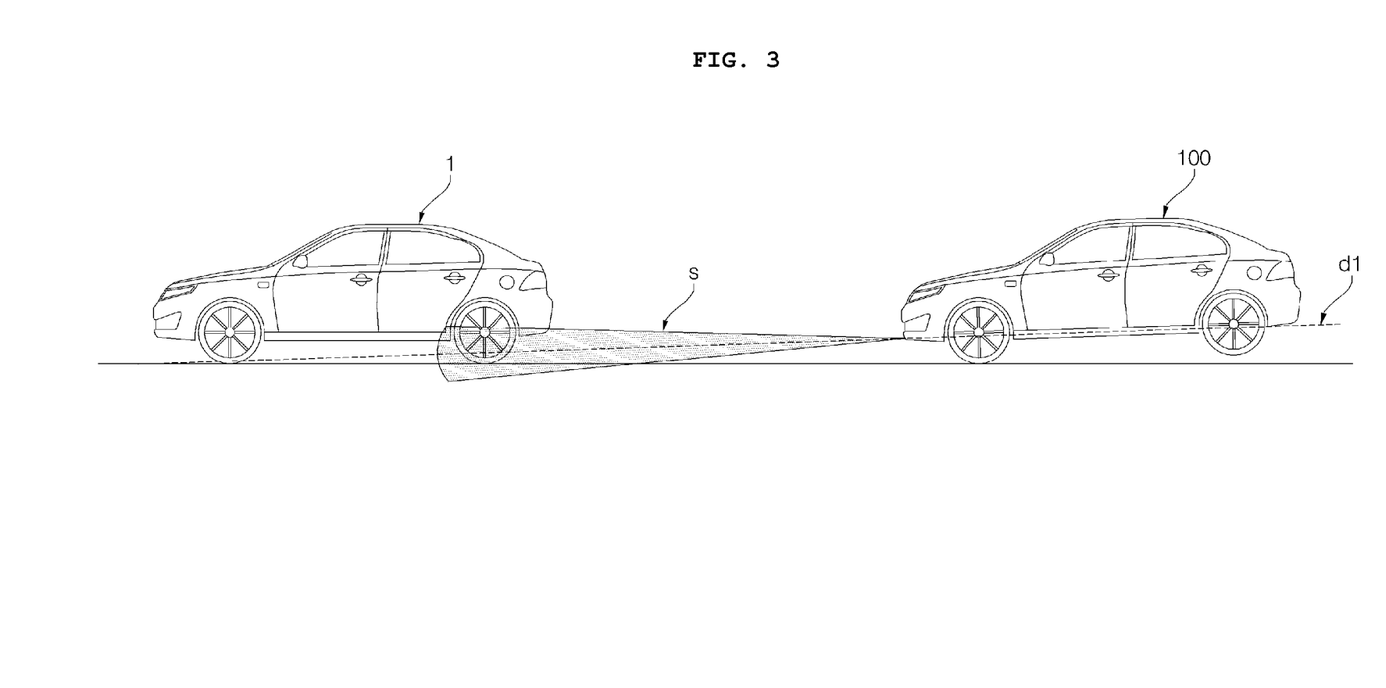

FIG. 3 is a view of performing autonomous emergency braking when the vehicle 100 determines that the front vehicle 1 is located in an estimated collision range.

In this case, it is understood that the pitching motion of the vehicle is generated by the braking of the vehicle 100 so that a direction d1 of radiating the signal from the sensor module 110 varies depending on the inclination of the vehicle 100.

Figure 4:
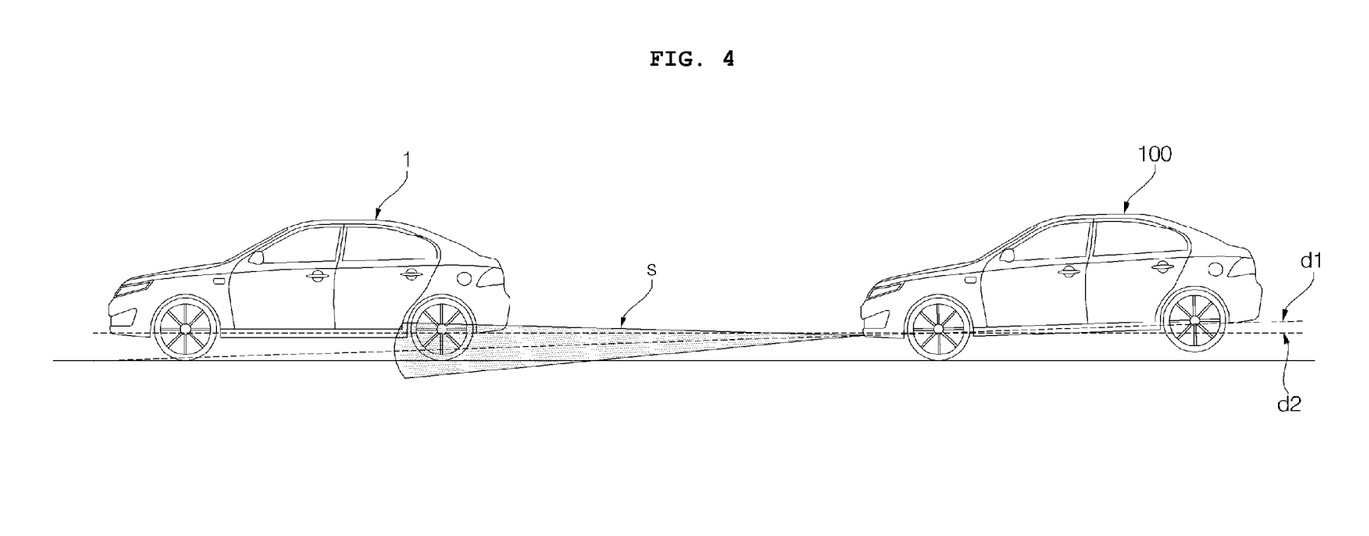

As illustrated in FIG. 4, in the autonomous emergency braking system of a vehicle according to the exemplary embodiment of the present invention, the sensor control module 130 determines whether to adjust the signal radiating direction of the sensor module 110 using the acceleration of the vehicle 100 in order to prevent the front vehicle 1 from being undetected due to the pitching motion of the vehicle 100.

When it is determined to adjust the signal radiating direction of the sensor module 110, the sensor control module 130 upwardly adjusts the signal radiating direction of the sensor module 110 d2 to detect the front vehicle.

Figure 5:
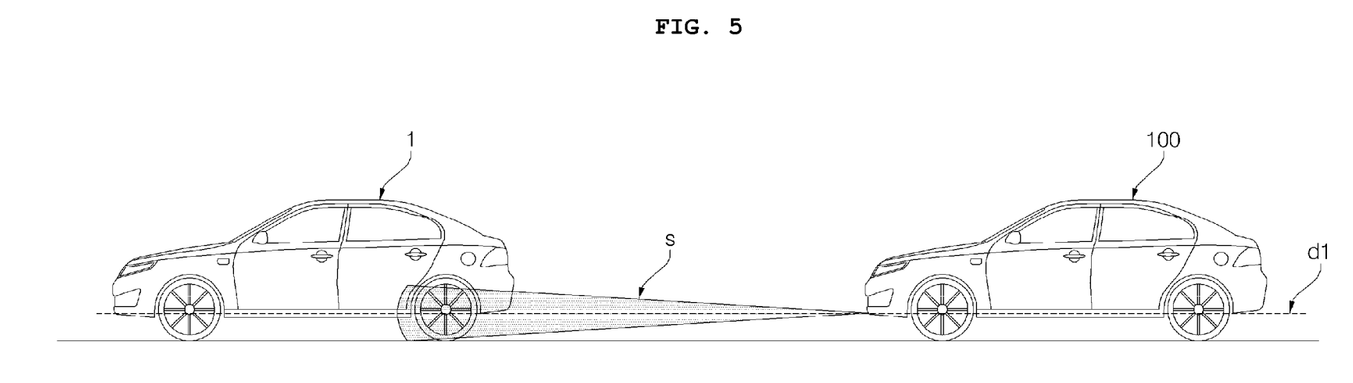

As illustrated in FIG. 5, in the autonomous emergency braking system of the vehicle according to the exemplary embodiment of the present invention, when the braking of the vehicle 100 ends or the vehicle 100 stops, the sensor control module 130 adjusts the signal radiating direction of the sensor module 110 to the original direction.

An autonomous emergency braking method of a vehicle according to an exemplary embodiment of the present invention may include an object detecting step of radiating a signal to the front of the vehicle when the vehicle is being driven to detect an object in front of the vehicle, a vehicle braking step of determining whether the object collides with the vehicle and putting the brake on the vehicle when it is determined that the object collides with the vehicle, and a sensor control step of, when the vehicle brakes to be forwardly inclined, adjusting a signal radiating direction to detect the object.

In the object detecting step, when the object is detected, a sensor which is provided in the vehicle is used and the sensor may be at least one of a light detection and ranging (LIDAR) sensor, an ultrasonic wave sensor, and a laser sensor.

In the vehicle braking step, when it is determine whether the object collides with the vehicle, a distance between the vehicle and the object and an estimated collision distance are calculated, the estimated collision distance is compared with the distance, and when the distance is shorter than the estimated collision distance, it is determined that the object collides with the vehicle to put the brakes on the vehicle.

In the vehicle braking step, when the distance between the vehicle and the object is calculated, an acceleration and a speed of the vehicle are measured and the distance may be calculated using a time when the radiated signal is reflected and returns.

In the sensor control step, it is determined whether the vehicle is forwardly inclined by comparing the acceleration of the vehicle with a set threshold acceleration and when it is determined that the vehicle is forwardly inclined, it is determined to adjust the radiating direction of the signal to adjust the radiating direction of the signal so as to detect the object.

In the sensor control step, when the acceleration of the vehicle is larger than the threshold acceleration, it is determined that the vehicle is forwardly inclined to determine to adjust the radiating direction of the vehicle and when the acceleration is smaller than the threshold acceleration, it is determined that the vehicle is not forwardly inclined to determine not to adjust that the radiating direction of the signal.

The autonomous emergency braking method of a vehicle according to an exemplary embodiment of the present invention may further include a sensor readjusting step that compares the acceleration with the set threshold acceleration after adjusting the radiating direction of the signal and determines whether the vehicle is in a uninclined state again after being inclined to adjust the radiating direction of the signal.

In the sensor readjusting step, when it is determined that the vehicle is inclined and then is in a uninclined state again, it is determined to adjust the radiating direction of the signal to the original direction and the radiating direction of the signal may be adjusted to the original direction.

Figure 6:
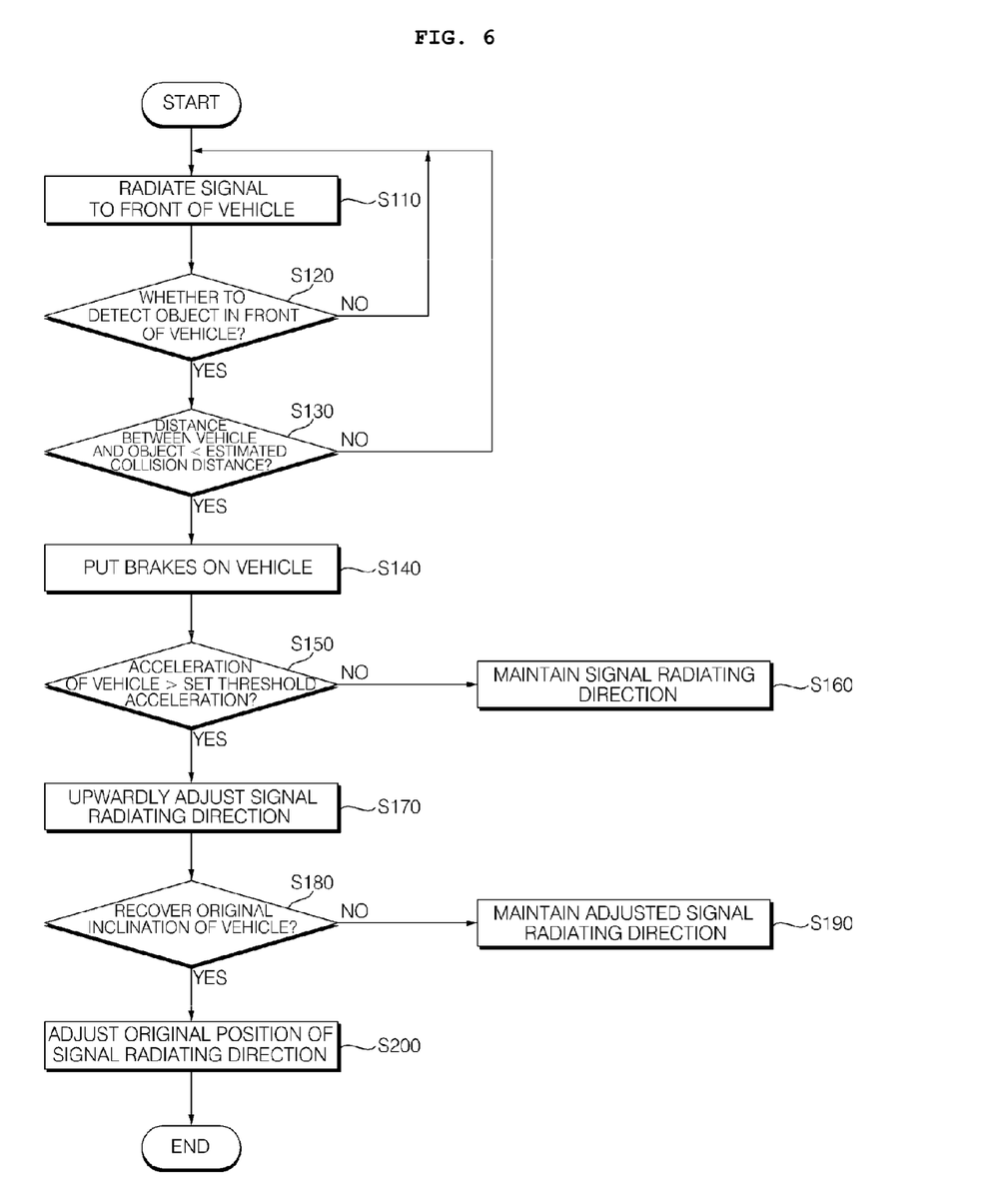
FIG. 6 is a flowchart illustrating an autonomous emergency braking method of a vehicle according to an exemplary embodiment of the present invention.

FIG. 6 is a flowchart illustrating an autonomous emergency braking method of a vehicle according to an exemplary embodiment of the present invention. An autonomous emergency braking method of a vehicle according to an exemplary embodiment of the present invention will be described with reference to FIG. 6.

A sensor module 110 radiates a signal to the front of the vehicle to detect an object in front of the vehicle.

The sensor module 110 determines whether a radiated signal is reflected and returns to determine whether there is an object in front of the vehicle.

When the object in front of the vehicle is detected by the sensor module 110, a distance calculating unit 122 of the autonomous control module 120 determines whether a distance between the vehicle and the object is shorter than an estimated collision distance.

When the distance is shorter than the estimated collision distance, a braking unit 126 of the autonomous control module 120 puts the brakes on the vehicle.

A condition determining unit 132 of the sensor control module 130 determines whether an acceleration of the vehicle is larger than a set threshold acceleration when the vehicle brakes.

When it is determined that the acceleration of the vehicle is smaller than the set threshold acceleration, the signal radiating direction of the sensor module 110 is maintained.

When it is determined that the acceleration of the vehicle is larger than the set threshold acceleration, a control unit 134 of the sensor control module 130 upwardly adjusts the signal radiating direction of the sensor module 110.

After upwardly adjusting the signal radiating direction of the sensor module 110, the condition determining unit 132 of the sensor control module 130 determines whether an inclination of the vehicle is recovered to an original inclination. For example, when the vehicle stops or a speed of the vehicle is constant, the inclination of the vehicle becomes the original inclination.

When the inclination of the vehicle is not recovered to the original inclination, the control unit 134 of the sensor control module 130 maintains the upwardly adjusted signal radiating direction of the sensor module 110.

When the inclination of the vehicle is recovered to the original inclination, the control unit 134 of the sensor control module 130 adjusts the upwardly adjusted signal radiating direction of the sensor module 110 to the original signal radiating direction.

Preferred embodiments of the present invention have been illustrated and described above, but the present invention is not limited to the above-described specific embodiments, it is obvious that various modification may be made by those skilled in the art, to which the present invention pertains without departing from the gist of the present invention, which is claimed in the claims, and such modification should not be individually understood from the technical spirit or prospect of the present invention.

Systems, apparatuses, and methods consistent with this disclosure may be implemented as instructions on a non-transitory computer-readable storage medium. The system may be implemented by one or more Central Processing Units (CPU) having circuitry configured to control execution of the various functions performed by the sensor module 110, the autonomous control module 120, and the sensor control module 130.

What is claimed is:

1. An autonomous emergency braking system of a vehicle, comprising:
a sensor which radiates a signal to the front of the vehicle when the vehicle is being driven to detect an object in front of the vehicle; and
circuitry configured to:
calculate a distance between the vehicle and the object based on the signal radiated from the sensor, in order to determine whether the object is within an estimated collision distance from the vehicle, and put the brakes on the vehicle when it is determined that the object is within the estimated collision distance from the vehicle, wherein the estimated collision distance is calculated on the basis of an acceleration and a speed of the vehicle and the distance between the vehicle and the object is calculated using a time when the signal radiated from the sensor is reflected;
compare the acceleration of the vehicle with a predetermined threshold acceleration for vehicle braking, in order to determine whether the vehicle becomes forwardly inclined in a pitching motion generated by putting the brakes on the vehicle and whether to adjust the signal radiating direction of the sensor temporarily upwardly so as to allow the sensor to detect the object, and
adjust a signal radiating direction of the sensor temporarily from an original direction to a relatively upward direction based on a determined amount of forward inclination of the vehicle when the acceleration of the vehicle is larger than the predetermined threshold acceleration for vehicle braking, in order to control the sensor to detect the object, and when the acceleration of the vehicle is smaller than the predetermined threshold for vehicle braking, determine that the vehicle is not forwardly inclined in order to determine not to adjust the signal radiating direction of the sensor.

2. The autonomous emergency braking system of claim 1, wherein the sensor includes at least one of a light detection and ranging (LIDAR) sensor, an ultrasonic wave sensor, and a laser sensor.

3. The autonomous emergency braking system of claim 1, wherein the circuitry is further configured to, after adjusting the signal radiating direction of the sensor upwardly, compare the acceleration of the vehicle with the predetermined threshold acceleration for vehicle braking and to determine whether the vehicle is in an uninclined state again after being forwardly inclined in order to determine whether to adjust the signal radiating direction of the sensor to the original direction.

4. The autonomous emergency braking system of claim 3, wherein when it is determined to adjust the signal radiating direction of the sensor to the original direction, the circuitry is further configured to adjust the signal radiating direction of the sensor module to the original direction.

5. An autonomous emergency braking method of a vehicle, performed via at least one processor, the method comprising:
radiating a signal from a sensor to the front of the vehicle when the vehicle is being driven to detect an object in front of the vehicle;
calculating a distance between the vehicle and the object based on the signal radiated to the front of the vehicle, in order to determine whether the object is within an estimated collision distance from the vehicle, and putting the brake on the vehicle when it is determined that the object is within the estimated collision distance from the vehicle, wherein the estimated collision distance is calculated on the basis of an acceleration and a speed of the vehicle and the distance between the vehicle and the object is calculated using a time when the signal radiated from the sensor is reflected;

comparing the acceleration of the vehicle with a predetermined threshold acceleration for vehicle braking, in order to determine whether the vehicle becomes forwardly inclined in a pitching motion generated by putting the brakes on the vehicle and whether to adjust the signal radiating direction of the sensor temporarily upwardly so as to allow the sensor to detect the object, and adjusting a signal radiating direction of the sensor temporarily from an original direction to a relatively upward direction based on a determined amount of forward inclination of the vehicle when the acceleration of the vehicle is larger than the predetermined threshold acceleration for vehicle braking, in order to control the sensor to detect the object, and when the acceleration of the vehicle is smaller than the predetermined threshold for vehicle braking, determining that the vehicle is not forwardly inclined in order to determine not to adjust the signal radiating direction of the sensor.

6. The autonomous emergency braking method of claim 5, wherein the sensor radiating the signal to the front of the vehicle is at least one of a light detection and ranging (LIDAR) sensor, an ultrasonic wave sensor, and a laser sensor.

7. The autonomous emergency braking method of claim 5, further comprising:

after adjusting the signal radiating direction of the sensor to the relatively upward direction, comparing the acceleration of the vehicle with the predetermined threshold acceleration and determining whether the vehicle is in a uninclined state after being forwardly inclined, in order to adjust the signal radiating direction back to the original direction.

8. The autonomous emergency braking method of claim 7, wherein when it is determined that the vehicle is in the uninclined state after being forwardly inclined, it is determined to adjust the radiating direction of the sensor to the original direction and the radiating direction of the signal is adjusted to the original direction.

* * * * *